US008652361B2

(12) United States Patent
Zaghib et al.

(10) Patent No.: US 8,652,361 B2
(45) Date of Patent: Feb. 18, 2014

(54) COMPOSITE ELECTRODE MATERIAL

(75) Inventors: Karim Zaghib, Longueuil (CA); Chiaki Sotowa, Omachi (JP); Patrick Charest, Sainte-Julie (CA); Masataka Takeuchi, Zama (JP); Abdelbast Guerfi, Brossard (CA)

(73) Assignees: Hydro-Quebec, Montreal, Quebec (CA); Showa Denko K.K., Tokyo (JP)

( * ) Notice: Subject to any disclaimer, the term of this patent is extended or adjusted under 35 U.S.C. 154(b) by 383 days.

(21) Appl. No.: 12/867,414

(22) PCT Filed: Feb. 24, 2009

(86) PCT No.: PCT/CA2009/000188
§ 371 (c)(1),
(2), (4) Date: Dec. 3, 2010

(87) PCT Pub. No.: WO2009/105863
PCT Pub. Date: Sep. 3, 2009

(65) Prior Publication Data
US 2011/0068294 A1    Mar. 24, 2011
US 2011/0266495 A2    Nov. 3, 2011

(30) Foreign Application Priority Data

Feb. 28, 2008 (CA) .................................. 2623407

(51) Int. Cl.
*H01B 1/20* (2006.01)
*H01M 4/36* (2006.01)
*H01M 4/48* (2010.01)

(52) U.S. Cl.
USPC ............ 252/506; 252/511; 264/104; 429/232

(58) Field of Classification Search
USPC .......... 427/58, 126.1; 429/232, 209; 264/104, 264/105; 252/511
See application file for complete search history.

(56) References Cited

U.S. PATENT DOCUMENTS

| 5,521,026 A | * | 5/1996 | Brochu et al. ................ 429/307 |
| 5,856,043 A | * | 1/1999 | Ohsaki et al. ................ 429/332 |
| 6,855,272 B2 | | 2/2005 | Burlingame et al. |
| 6,855,273 B2 | * | 2/2005 | Ravet et al. ................ 252/506 |
| 8,241,541 B2 | * | 8/2012 | Vallee et al. ................ 264/118 |

(Continued)

FOREIGN PATENT DOCUMENTS

| JP | 2003-292309 A | 10/2003 |
| JP | 2004-063433 A | 2/2004 |

(Continued)

OTHER PUBLICATIONS

International Search Report (PCT/ISA/210) issued on May 26, 2009, by Canadian Patent Office as the International Searching Authority for International Application No. PCT/CA2009/000188.

(Continued)

*Primary Examiner* — Mark Kopec
(74) *Attorney, Agent, or Firm* — Buchanan Ingersoll & Rooney P.C.

(57) ABSTRACT

The invention relates to a composite electrode material consisting of a carbon coated complex oxide, fibrous carbon and a binder. Said material is prepared by a method which comprises co-grinding an active electrode material and fibrous carbon, and adding a binder to the co-grinded mixture to lower the viscosity of the mixture. The fibrous carbon is preferably vapor grown carbon fibers.

8 Claims, 4 Drawing Sheets

(56) References Cited

U.S. PATENT DOCUMENTS

| | | |
|---|---|---|
| 2003/0198588 A1 | 10/2003 | Muramaki et al. |
| 2007/0026316 A1 | 2/2007 | Imachi et al. |
| 2007/0275302 A1 | 11/2007 | Sotowa et al. |
| 2009/0155689 A1* | 6/2009 | Zaghib et al. ............ 429/221 |
| 2012/0214070 A1* | 8/2012 | Yamamoto et al. ...... 429/231.8 |

FOREIGN PATENT DOCUMENTS

| | | |
|---|---|---|
| JP | 2004-186075 A | 7/2004 |
| JP | 2005-158305 A | 6/2005 |
| JP | 2006164859 A | 6/2006 |
| JP | 2009-016265 A | 1/2009 |
| JP | 2009043514 A | 2/2009 |
| KR | 2002-0079280 A | 10/2002 |
| WO | WO 2004/008560 A2 | 1/2004 |
| WO | WO 2004/044289 A1 | 5/2004 |

OTHER PUBLICATIONS

Written Opinion (PCT/ISA/237) issued on May 19, 2009, by Canadian Patent Office as the International Searching Authority for International Application No. PCT/CA2009/000188.
Office Action issued in JP Patent Application 2010-547927 on Oct. 1, 2013 with English language translation (7 pages).

* cited by examiner

COMPOSITE ELECTRODE MATERIAL

FIELD OF THE INVENTION

The present invention relates to a composite electrode material and to a method for the preparation thereof.

BACKGROUND

It is known to use composite electrodes in lithium batteries, wherein the composite electrode material comprises a complex oxide as the active material, a carbonaceous material as the electronic conducting and a binder.

U.S. Pat. No. 5,521,026 (Brochu et al.) discloses a battery wherein the electrolyte is a solid polymer electrolyte, the anode is a lithium anode, and the cathode comprises a mixture of $V_2O_5$ and carbon black on a current collector. The composite cathode material is obtained by ball-milling the oxide and the carbon black in a liquid solvent, using stainless steel balls. Performances of such a battery are improved by ball-milling compared to a battery wherein the cathode components are simply mixed. However, using steel balls introduces impurities on the cathode material which leads to side reactions.

WO 2004/008560 (Zaghib et al.) describes a composite cathode material. Said cathode material is obtained by high energy milling a mixture of a non conducting or semiconducting material, a low crystallinity carbon (C1) and a high cristallinity carbon (C2). Carbon black is an example of low cristallinity carbon, and graphite is an example of high crystallinity carbon.

U.S. Pat. No. 6,855,273 (Ravet et al.) describes a method for preparing an electrode material by heat treatment of a carbonaceous precursor in the presence of a complex oxide or the precursors thereof, in a controlled atmosphere. The electrode material thus obtained is made of complex oxide particles having a carbon coating and the conductivity thereof is substantially increased compared to the non coated oxide particles. The increased conductivity is due to the presence of the carbon coating which is chemically bonded to the oxide particle surface. The chemical bonds provide excellent adhesion and high local conductivity. The carbonaceous precursor may be a polymer precursor or a gaseous precursor. A composite electrode material is prepared by mixing the carbon coated particles with a carbon black, and PVDF as the binder. Carbon black must be added to the complex oxide particles when preparing the electrode to achieve a capacity of 170 mAh/g which is the theoretical capacity.

WO 2004/044289 (Yano et al.) discloses a composite material obtained by mixing vapor grown carbon fibers with a matrix material, said matrix material being a resin, a ceramic or a metal, to enhance thermal conductivity and electrical conductivity.

US 2003/0198588 (Muramaki et al.) discloses a battery wherein an electrode is made of a composite material comprising carbon fibers such as vapor grown carbon fibers. Carbon fibers exhibit a great intercalation property as a carbonaceous material for a negative electrode. A composite negative electrode material is prepared by kneading a mixture of carbon fibers and a binder.

SUMMARY OF THE INVENTION

The present invention provides a method for preparing a composite electrode material and the material thus obtained.

According to an aspect of the invention, the method of the invention comprises co-grinding an active electrode material and fibrous carbon, and adding a binder to the co-grinded mixture to lower the viscosity of the mixture.

According to another aspect of the invention, the composite electrode material comprises fibrous carbon, an active electrode material and a binder.

Preferably, the active electrode material is a carbon coated complex oxide.

According to another aspect of the invention, a composite electrode comprising the composite electrode material on a current collector is provided.

DETAILED DESCRIPTION OF THE INVENTION

Figure 1:
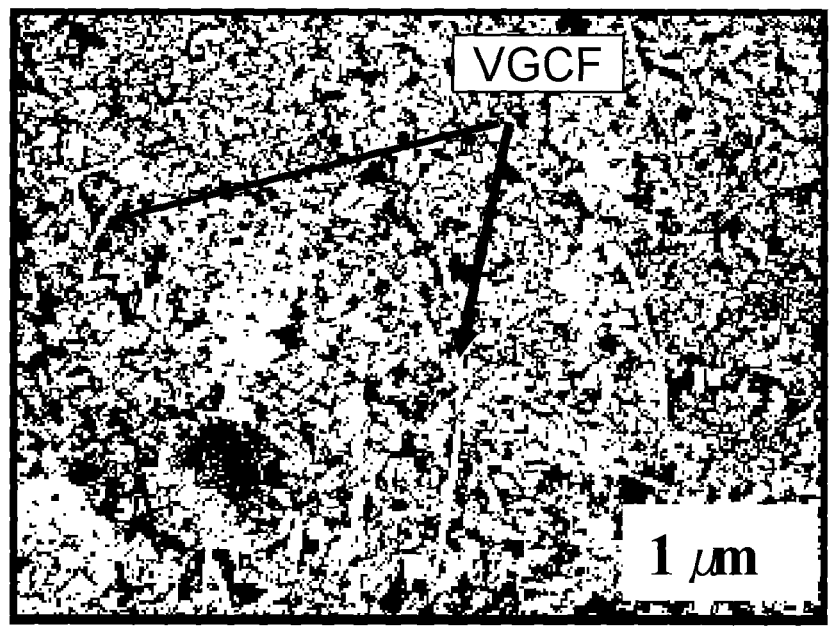
FIGS. 1 and 2 are SEM micrographs respectively of the C—$LiFePO_4$/VGCF™ mixture of Example 1 and of the C—$LiFePO_4$/AB mixture of Comparative Example 1, each after co-grinding in the Nobilta® grinder and elimination of NMP.

The active electrode material used to prepare the composite electrode material of the invention is a carbon coated complex oxide. The complex oxide is preferably a sulfate, a phosphate, a silicate, an oxysulfate, an oxyphosphate or an oxysilicate of a transition metal and lithium, or a mixture thereof. $LiFePO_4$, $LiMnPO_4$, $LiFeSiO_4$, SiO, and $SiO_2$ are preferred complex oxides. A carbon coated oxide may be obtained by contacting the oxide with an organic precursor of a carbonaceous material, and by pyrolyzing said precursor. The carbon coated complex oxide is preferably used in the form of nanosize particles.

The fibrous carbon used to prepare the composite electrode material of the invention consists of carbon fibers, wherein a carbon fiber consists of fiber filaments, said filaments having a diameter of 5 to 500 nm and an aspect ratio (length/diameter) of 20 to 10000.

Carbon fibers may be obtained by a method comprising spraying a solution containing a carbon source and a transition metal into a reaction zone and subjecting the carbon source to thermal decomposition, heating the carbon fibers thus obtained in a non-oxidative atmosphere at a temperature between 800° C. to 1500° C., and further heating the carbon fibers in a non-oxidative atmosphere at 2000° C.-3000° C. More detailed information on the method for preparing vapor grown carbon fibers can be found in WO 2004/044289 (Yano et al.). The second heat treatment of the carbon, at 2000-3000° C., cleans the surface of the fibers and results in increasing the adhesion of the carbon fibers to the carbon coating of the complex oxide particles. The carbon fibers thus obtained are so-called vapor grown carbon fibers.

Vapor grown carbon fibers are also commercially available from Showa Denko K.K. (Japan), under the trade name VGCF™.

The binder may be selected from fluorine-based polymers, for example polyvinylidene fluoride (PVDF), polytetrafluoroethylene (PTFE), and from rubbers, for example a styrene butadiene rubber (SBR), or natural rubber. The amount of binder added is selected to lower the viscosity of the mixture to less than $10^6$ Pas.

Co-grinding of the carbon fibers and the carbon coated complex oxide particles may made by mecanofusion.

Mechanofusion is a dry process performed in a mecanofusion reactor comprising a cylindrical chamber which rotates at high speed and which is equipped inside with compression tools and blades. Rotation speed is generally higher than 1000 rpm. The carbon coated complex oxide particles and the fibrous carbon are introduced in the chamber. Upon rotation of the chamber, the particles are pressed together and to the chamber walls. The compression tools and the centrifuge force created by the high rotation speed promotes adhesion between the carbon fibers and the carbon coated complex oxide particles.

Examples of mechanofusion reactors are the grinders available from Hosokawa Micron Corporation (Japan) under the trade names Nobilta® or Mechanofusion®, and the grinders available from Nara Machinery Ltd under the trade name Hybridizer.

Co-grinding in ball-mills is not recommended, because it would introduce impurities in the material. If no impurities are introduced during co-grinding of the carbon fibers and the complex oxide particles, no side reactions occur upon electrochemical charge/discharge of the electrodes comprising the composite material, and said electrodes will provide very high safety in the cells.

The binder is added to the mixture obtained after co-grinding, in the form of a solution in an appropriate solvent. N-methyl-2-pyrrolidone is a solvent for a fluorine-based solvent. Water is a solvent for a SBR rubber. The amount of binder added is selected to provide a mixture having preferably a viscosity lower than $10^6$ Pas.

The low viscosity material obtained after adding the binder solution to the co-ground mixture may be used to prepare an electrode. An electrode may be obtained by depositing a film of said low viscosity material on a conductive support acting as the current collector, and eliminating the solvent by evaporation.

The composite electrode material obtained on the current collector after evaporation of the solvent consists of carbon coated complex oxide particles, carbon fibers and a binder, wherein the carbon coating of the complex oxide particles is strongly bonded to the complex oxide core of the particles, and the vapor grown carbon fibers are strongly bonded to the carbon coating, via a chemical C—C chemical bonding. The complex oxide particles are preferably nanosize particles.

A composite electrode material according to the invention preferably contains from 0.5 to 20 wt % vapor grown carbon fibers. A carbon fiber content higher than 5 wt % does not provide further significant improvement of the electrode performances, but generates a higher cost.

In a preferred embodiment, the electrode material contains 0.5-5 wt % vapor grown carbon fibers, 70-95 wt % complex oxide and 1-25 wt % polymer binder, the total being 100%.

A composite electrode material according to the present invention is particularly useful for electrochemical cells wherein the electrolyte is an ionic compound having lithium ions. If the electrochemical cell is intended to be subjected to high discharge rates, the composite electrode material preferably contains about 5 wt % fibrous carbon in order to provide high discharge potential. If the electrochemical cell is intended to be subjected to low discharge rate, even a low fibrous carbon content allows high discharge potential.

The composite material of the present invention has several advantages when it is used as the active material of a composite electrode.

The composite material of the invention has a high mechanical strength that is beneficial during intercalation and de-intercalation of lithium where volume change of the particles and the electrode occurs. The composite material is capable of adsorbing the volume change during charge/discharge of the cell.

In composite electrode materials consisting of nanoparticles of a complex oxide particles, it is difficult to create a channel structure and a porosity which is suitable for an electrode, when the electrode is made by calendaring. The presence of the fibrous carbon in the composite material comprising nanoparticles creates a multi-channel structure, which improves the wetability of the material by a liquid electrolyte. Thus, the surface and the core of the particles are accessible to the electrolyte, which enhances the ionic conductivity locally on the particle.

As fibrous carbon has a high conductivity, there is no need to add another source of carbon in the composite electrode material.

Fibrous carbon increases conductivity locally at each particle and creates a conductive network in the electrode material. The higher conductivity yields high capacity (mAh/g) at high charge/discharge rates. In addition, high capacity is still achieved at low temperature, in particular at temperatures less than $-20°$ C.

As small amounts of fibrous carbon are requested, an electrochemical cell containing the composite material as an electrode material has a higher energy by weight and volume.

The presence of fibrous carbon in a composite electrode material contributes to form a stable passivation layer on the surface of the electrode in an electrochemical cell having a solid electrolyte, so that the irreversible capacity loss (ICL) decreases.

The resistance of a composite electrode containing fibrous carbon is reduced, so that the voltage drop (IR) is very small, which provides lower volumetric specific impedance (VSI) and lower area specific impedance (ASI). These specifications are necessary for high-power applications such as power tools and hybrid electric vehicles.

The present invention is further explained by means of the following examples, to which it is however not limited.

In the examples, the composite materials were prepared starting from the following products:

C—LiFePO$_4$ a material consisting of carbon coated LiFePO$_4$ particles, available from Phostech Inc.

Acetylene black available under the trade name Denka Black from Denka (Japan).

VGCF™ fibrous carbon available from Showa Denko (Japan). The fiber diameter is 150 nm, the fiber length is about 10 µm, the specific area is 13 m$^2$/g, the electric conductivity is 0.1 mΩ·cm, and the purity is >99.95.

PVDF polyvinyldifluoride available from Kureha (Japan).

SBR styrene butadiene rubber, available under the trade name BM400 from Zeon (Japan).

Co-grinding was performed in the following grinders:

NOB300-Nobilta® available from Hosokawa Micron Corporation.

Mecanofusion available from Hosokawa Micron Corporation.

The obtained materials were analyzed by Scanning Electron Microscopy (SEM), Transmission Electron Microscopy (TEM) and X ray diffraction (XRD).

EXAMPLE 1

300 g of C—LiFePO$_4$ and 9 g of VGCF™ were mixed in a Nobilta® grinder for 5 minutes. Then 16.25 g of PVDF (representing 5% of the total weight of LiFePO$_4$, VGCF™ and PVDF) dissolved in NMP were added and the slurry obtained was coated on a polypropylene sheet. After elimination of NMP by evaporation, the resistance measured on the coating is 7 Ω·cm.

COMPARATIVE EXAMPLE 1

The procedure of example 1 was repeated, using 9 g of acetylene black AB instead of VGCF™ The resistance of the sample is 30 Ω·cm, which is much higher than in Example 1.

Figure 2:
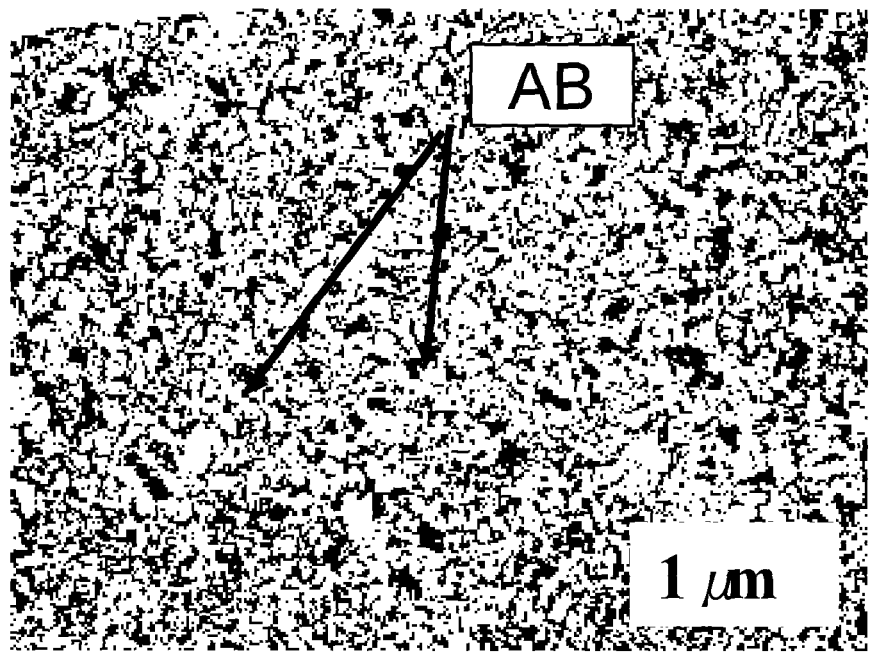

FIGS. 1 and 2 are SEM micrographs respectively of the C—LiFePO$_4$/VGCF™ mixture and of the C—LiFePO$_4$/AB mixture, each after co-grinding in the Nobilta® grinder and elimination of NMP. On FIG. 1, the arrows show the fibrous carbon. On FIG. 2, the arrows show the non fibrous acetylene black.

EXAMPLE 2

300 g of C—LiFePO$_4$ and 9 g of VGCF™ were mixed in a Mechanofusion® grinder for 30 minutes. Then 16.25 g of PVDF (representing 5% of the total weight of LiFePO$_4$, VGCF™ and PVDF) dissolved in NMP were added and the slurry obtained was coated on a polypropylene sheet. After elimination of NMP, the resistance measured on the coating is 8 Ω·cm.

COMPARATIVE EXAMPLE 2

The procedure of example 2 was repeated, using 9 g of acetylene black instead of VGCF™ The resistance of the sample is 35 Ω·cm, which is much higher than in Example 2.

EXAMPLE 3

300 g of C—LiFePO$_4$ and 9 g of VGCF™ were mixed in a Mechanofusion® grinder for 30 minutes. Then 16.25 g of PVDF (representing 5% of the total weight of LiFePO$_4$, VGCF™ and PVDF) dissolved in NMP, were added and the slurry obtained was coated on an aluminum collector. After elimination of NMP, the electrode thus obtained was immersed in propylene carbonate (PC). The electrode was completely impregnated with PC within 5 seconds.

COMPARATIVE EXAMPLE 3

The procedure of example 3 was repeated, using 9 g of acetylene black instead of VGCF™ The electrode was completely impregnated with PC after 370 seconds, which is much longer than in Example 3.

EXAMPLE 4

300 g of C—LiFePO$_4$ and 9 g of VGCF™ were mixed in a Mechanofusion® grinder for 30 minutes. Then 17.98 g of SBR (representing 5.5% of the total weight of LiFePO$_4$, VGCF™ and SBR) dissolved in water were added and the slurry obtained was coated on an aluminum collector. After elimination of water, the rate of composite material on the collector is 10 mg/cm$^2$. The electrode thus obtained was immersed in propylene carbonate (PC).

Further samples were prepared according to the same procedure, using acetylene black instead of VGCF™, and then adding no carbon.

Figure 3:
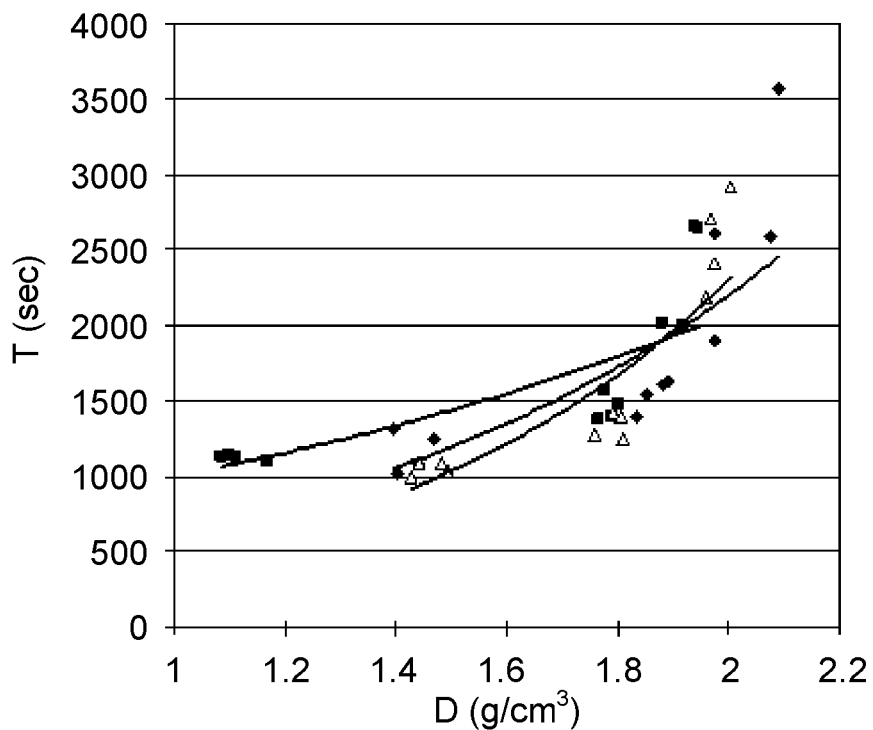
FIG. 3 represents the time T (in seconds) as a function of the electrode density D (g/cm$^3$), for various co-grinded C—$LiFePO_4$/carbon mixtures of Example 4 and Comparative Example 4.

FIG. 3 represents the time T (in seconds) as a function of the electrode density D (g/cm$^3$). "Electrode density" D means the weight per volume unit of electrode material, the electrode material comprising the complex oxide, the added carbon (carbon fiber or acetylene black) if any, and absorbed PC if any. Time T represents the time for complete absorption of 3 μL of PC.

♦ corresponds to the sample without carbon,
Δ corresponds to the sample with acetylene black and
■ corresponds to the sample with VGCF™.

FIG. 3 shows that after complete absorption of 3 μL of PC, the electrode density D is around 2 g/cm$^2$. This density is achieved within 2000 seconds for a material containing carbon fibers, within 3000 seconds for a material containing acetylene black, and after more than 3500 for a material without added carbon.

EXAMPLE 5

C—LiFePO$_4$ and VGCF™ were mixed in a Mechanofusion® grinder for 30 minutes. Then SBR dissolved in water was added in an amount representing 3 wt % of the total weight of C—LiFePO$_4$, VGCF™ and SBR, and the slurry obtained was coated on an aluminum collector. After elimination or water, the rate of composite material on the collector is 28 mg/cm$^2$. The electrode thus obtained was immersed in propylene carbonate (PC).

Further samples were prepared according to the same procedure, using acetylene black instead of VGCF™, and then adding no carbon.

Figure 4:
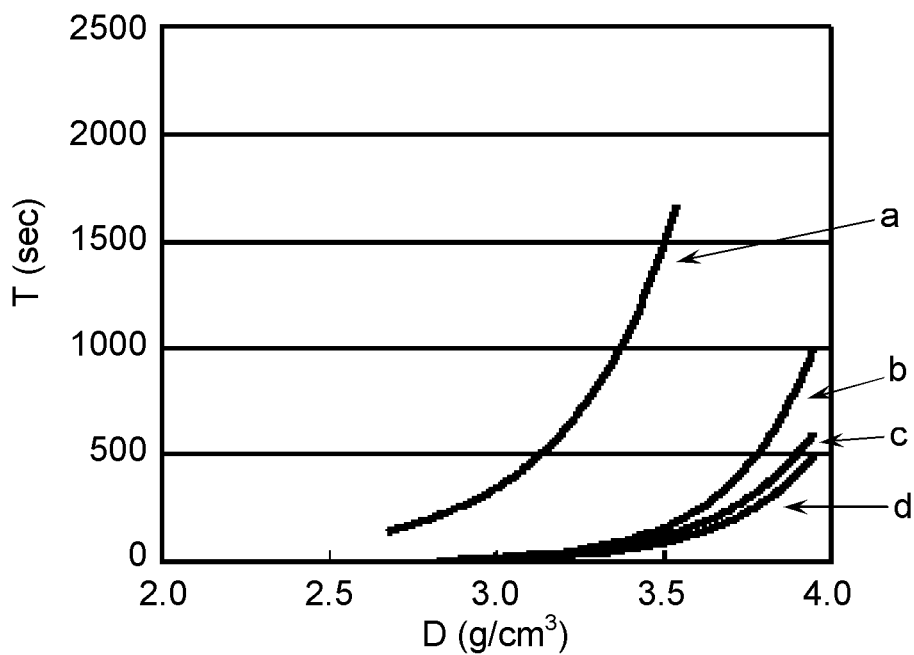
FIG. 4 shows the time T (in seconds) as a function of the electrode density D (g/cm$^3$) for various co-grinded C—$LiFePO_4$/carbon mixtures of Example 5 and Comparative Example 5.

FIG. 4 shows the time T (in seconds) as a function of the electrode density D (g/cm$^3$) which is related to the amount of PC absorbed. Time T represents the time for complete absorption of 3 μL of PC.

a corresponds to a sample with 3% (w/w) of acetylene black.
b corresponds to a sample with 1% (w/w) of VGCF™.
c corresponds to a sample with 2% (w/w) of VGCF™.
d corresponds to a sample with 0.5% (w/w) of VGCF™.

FIG. 4 shows that the material with acetylene black needs a very long time (more than 1500 seconds) to be impregnated by propylene carbonate, whereas the materials with carbon fibers absorb PC in less than 1000 seconds.

Addition of carbon as an electronic conducting agent being useful for the capacity of an electrode material, this figure shows that it is advantageous to add carbon in the form of vapor grown fibers, instead of in the conventional acetylene black.

EXAMPLE 6

An electrode was prepared according to the procedure of Example 3 and assembled in a cell further comprising a lithium anode and a Celgard 3501 separator impregnated with a 1M LiPF$_6$ EC-DEC (3:7) solution.

The cell was discharged at different rates: C/2, 2 C and 4 C. The capacity was 155 mAh/g for C/2, 155 mAh/g for 2 C and 153 mAh/g for 4 C.

COMPARATIVE EXAMPLE 6

A cell was assembled as in Example 6, but using an electrode prepared according to comparative example 3.

The cell was discharged at different rates: C/2, 2 C and 4 C. The capacity was 150 mAh/g for C/2, 148 mAh/g for 2 C and 120 mAh/g for 4 C.

Example 6 and comparative example 6 show that the cathode material of the invention allows higher discharge capacity, the difference being the highest at high discharge rate, corresponding to high discharge current.

EXAMPLE 7

C—LiFePO$_4$ and VGCF™ were mixed in a Mechanofusion® grinder for 30 minutes. Then SBR dissolved in water was added in an amount representing 5.5 wt % of the total weight of C—LiFePO$_4$, VGCF™ and SBR, and the slurry obtained was coated on an aluminum collector, at a rate of 10 mg/cm$^2$. The electrode thus obtained was immersed in propylene carbonate (PC) to obtain an electrode density of 1.7 g/cm$^3$.

A number of electrodes were prepared containing respectively 2 wt %, 3 wt % and 5 wt % VGCF™.

Each electrode was assembled in a cell further comprising a lithium anode and a Celgard 3501 separator impregnated with a 1M LiPF$_6$ EC-MEC (3:7) solution. The cell was discharged at different rates: C/2, 2 C and 4 C.

Figure 5:
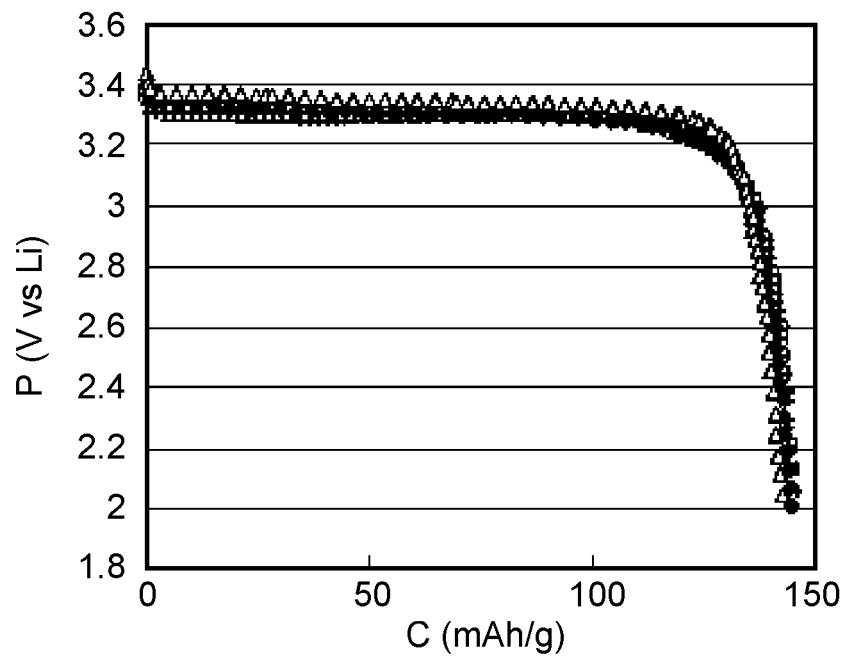
FIGS. 5, 6 and 7 represent the potential (V vs Li) as a function of the discharge capacity (mAh/g) for the 3 electrode compositions, respectively at a discharge rate of 0.5 C (FIG. 5), 2 C (FIG. 6) and 4 C (FIG. 7), according to Example 7.
Figure 6:
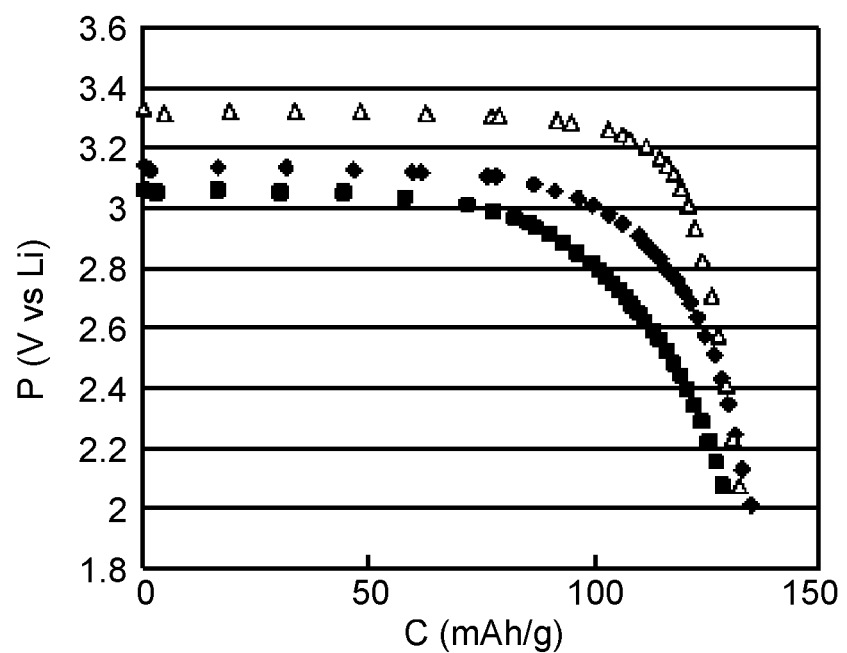
Figure 7:
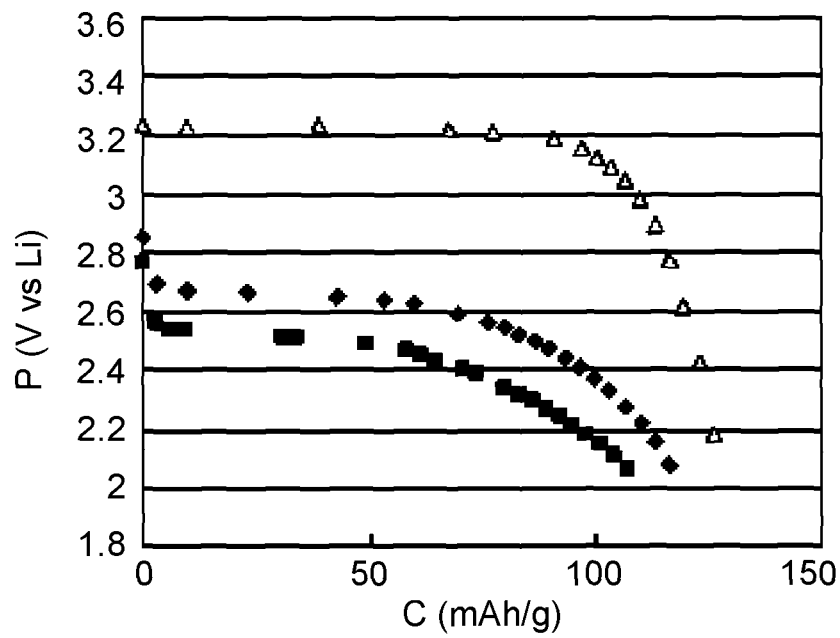

FIGS. 5, 6 and 7 represent the potential (V vs Li) as a function of the discharge capacity (mAh/g) for the 3 electrode compositions, respectively at a discharge rate of 0.5 C (FIG. 5), 2 C (FIG. 6) and 4 C (FIG. 7)
Δ corresponds to the electrode with 5 wt % VGCF™.
♦ corresponds to the electrode with 3 wt % VGCF™.
■ corresponds to the electrode with 2 wt % VGCF™.

FIGS. 5-7 show that, at high discharge rates, the higher content of VGCF™ provides higher discharge potential. At low discharge rates, a low VGCF™ content is enough to provide high discharge potential. If the electrode comprising the composite material of the invention is intended to be used in a device where discharge rates are low, only a very low VGCF™ content is necessary. If the device is submitted to high discharge rates, the VGCF™ content is preferably high, more preferably near 5 wt %.

EXAMPLE 8

C—LiFePO$_4$ and carbon were mixed in a Mechanofusion® grinder for 30 minutes. Then SBR dissolved in water was added in an amount representing 5.5 wt % of the total weight of C—LiFePO$_4$, carbon and SBR, and the slurry obtained was coated on an aluminum collector, at a rate of 10 mg/cm$^2$. The electrode thus obtained was immersed in propylene carbonate (PC).

A number of electrodes were prepared containing respectively 2 wt %, 3 wt % and 5 wt % VGCF™, 2 wt % and 3 wt % acetylene black AB, and containing no carbon.

Each electrode was assembled in a cell further comprising a lithium anode and a Celgard 3501 separator impregnated with a 1M LiPF$_6$ EC-MEC (3:7) solution. The electric resistance R was measured for various electrode densities D. The results are represented on FIG. 8.

Figure 8:
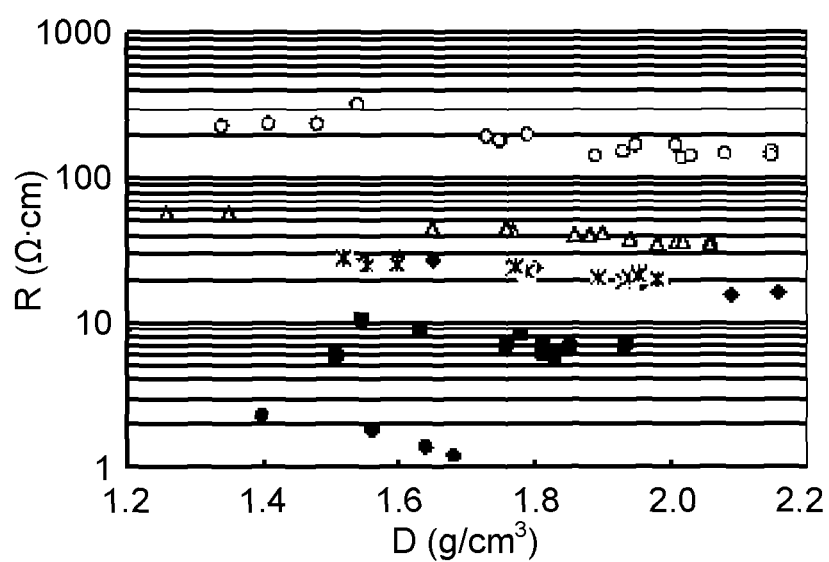
FIG. 8 shows the electric resistance R as a function of the electrode density D, for various electrodes, in an electrochemical cell further comprising a lithium anode and a Celgard 3501 separator impregnated with a 1M $LiPF_6$ EC-MEC (3:7) solution.

On FIG. 8:
♦ corresponds to the electrode with 2 wt % VGCF™.
■ corresponds to the electrode with 3 wt % VGCF™.
● corresponds to the electrode with 5 wt % VGCF™.
Δ corresponds to the electrode with 2 wt % AB.
✶ corresponds to the electrode with 5 wt % AB.
○ corresponds to the electrode without carbon added.

FIG. 8 shows that the highest resistance is obtained with an electrode having no conducting carbon added, and the lowest resistance is obtained with the highest content of VGCF™. At a given carbon content, the resistance is higher with AB than with VGCF™.

The invention claimed is:

1. A method for preparing an electrode comprising a composite electrode material on a current collector, said method comprising:
preparing a composite electrode material composition containing an active electrode material, fibrous carbon, and a binder, by co-grinding the active electrode material and fibrous carbon, and adding the binder and a solvent to the co-grinded mixture to lower the viscosity of the co-grinded mixture; and
depositing a film of the composite electrode material composition on a current collector,
wherein:
the active electrode material comprises carbon coated complex oxide particles obtained by pyrolyzing a mixture of complex oxide particles and an carbonaceous material; and
the fibrous carbon comprises vapor grown carbon fibers.

2. The method according to claim 1, wherein the carbon coated complex oxide particles are nanosize particles.

3. The method of claim 1, wherein the complex oxide is a sulfate, a phosphate, a silicate, an oxysulfate, an oxyphosphate or an oxysilicate of a transition metal and lithium, or a mixture thereof.

4. The method of claim 1 wherein the complex oxide is selected from LiFePO4, LiMnPO4, and LiFeSiO4.

5. The method of claim 1, wherein the vapor grown carbon fibers comprise fiber filaments, said filaments having a diameter of 5 to 500 nm and an aspect ratio (length/diameter) of 20 to 10000.

6. The method of claim 1, wherein the binder is selected from PVDF, PTFE, styrene butadiene rubber SBR, or natural rubber.

7. The method of claim 1, wherein the binder is added to the co-grinded mixture in the form of a solution in a solvent.

8. The method of claim 1, wherein co-grinding of the fibrous carbon and the carbon coated complex oxide particles is made by mecanofusion.

* * * * *